United States Patent [19]

Suzuki

[11] Patent Number: 4,842,428
[45] Date of Patent: Jun. 27, 1989

[54] ELECTRONIC TYPEWRITER WITH SPELL CHECKING AND CORRECTION

[75] Inventor: Makoto Suzuki, Nagoya, Japan

[73] Assignee: Brother Kogyo Kabushiki Kaisha, Aichi, Japan

[21] Appl. No.: 48,927

[22] Filed: May 13, 1987

[30] Foreign Application Priority Data

Oct. 16, 1984 [JP] Japan .................. 59-216764

[51] Int. Cl.⁴ .............................................. G06K 5/00
[52] U.S. Cl. ................................... 400/697; 400/63; 400/74; 400/98
[58] Field of Search ................... 400/63, 74, 70, 98, 400/110, 697, 697.1

[56] References Cited

U.S. PATENT DOCUMENTS

| | | | |
|---|---|---|---|
| 3,780,846 | 12/1973 | Kolpek et al. | 400/63 |
| 3,995,254 | 11/1976 | Rosenbaum | 340/146.3 WD |
| 4,041,467 | 8/1977 | Cota et al. | 400/91 |
| 4,136,395 | 1/1979 | Kolpek et al. | 400/63 |
| 4,198,906 | 4/1980 | Fujikawa et al. | 101/42 |
| 4,218,760 | 8/1980 | Levy | 364/900 |
| 4,323,315 | 4/1982 | Demonte et al. | 400/63 |
| 4,328,561 | 5/1982 | Convis et al. | 400/63 |
| 4,339,806 | 7/1982 | Yoshida | 364/900 |
| 4,383,307 | 5/1983 | Gibson, III | 364/900 |
| 4,408,302 | 10/1983 | Fessel et al. | 364/908 |
| 4,413,318 | 11/1983 | Herrington | 364/200 |
| 4,420,817 | 12/1983 | Yoshida | 364/900 |
| 4,438,505 | 3/1984 | Yanagiuchi et al. | 364/900 |
| 4,439,836 | 3/1984 | Yoshida | 364/900 |
| 4,456,969 | 6/1984 | Herzik et al. | 364/900 |
| 4,467,446 | 8/1984 | Sakurai | 364/900 |
| 4,498,148 | 2/1985 | Glickman | 364/908 |
| 4,499,553 | 2/1985 | Dickinson et al. | 364/900 |
| 4,502,128 | 2/1985 | Okajima et al. | 364/900 |
| 4,503,426 | 3/1985 | Mikulski | 340/711 |
| 4,503,514 | 3/1985 | Urquhart | 364/900 |
| 4,548,520 | 10/1985 | Ueno | 400/63 |
| 4,559,598 | 12/1985 | Goldwasser et al. | 364/489 |
| 4,564,301 | 1/1986 | Ueno | 400/63 |
| 4,567,573 | 1/1986 | Hashimoto et al. | 364/900 |
| 4,580,241 | 4/1986 | Kucera | 400/63 |
| 4,584,667 | 4/1986 | Hashimoto et al. | 364/900 |
| 4,590,560 | 5/1986 | Sado | 364/419 |
| 4,594,686 | 6/1986 | Yoshida | 364/900 |
| 4,611,995 | 9/1986 | Sado | 434/157 |
| 4,655,620 | 4/1987 | Adams et al. | 400/63 |

FOREIGN PATENT DOCUMENTS

5926280 10/1984 Japan.

OTHER PUBLICATIONS

"Video Disc Dictionary System", Cohen et al., *IBM Technical Disclosure Bulletin*, vol. 25, No. 8, Jan., 1983, p. 4209.

(List continued on next page.)

*Primary Examiner*—William Pieprz
*Attorney, Agent, or Firm*—Oliff & Berridge

[57] ABSTRACT

The present electronic typewriter comprises a memory for storing English sentences inputted into the electronic typewriter by operating its keyboard, a dictionary memory, in which data on plural English words are stored, and a spelling check control system. The typewriter is also provided with a checking execution key for checking the spelling of each English word of the English sentences stored in the memory. When the checking execution key is operated, a English sentence data stored in the memory are read out by the spelling check control means which judges the coincidence with those stored in the dictionary memory. If it is judged by the spelling check control means that the English words of the English sentences stored in the memory include a word not corresponding to any of the English word data stored in the dictionary memory, the printed position of the word on the printing paper is determined by a printed position detection means on the basis of the English sentence data stored in memory. A feed means and a carriage movement means are driven through the action of a drive control means on the basis of the printed position determined by the detection means, to guide a printing head to the printed position. Once all of the printed misspelled words have been corrected, the spelling correction confirmation mode is automatically cancelled.

14 Claims, 5 Drawing Sheets

OTHER PUBLICATIONS

"Eight Bit Character Excoding for Multiple Languages", V. A. Mayfield, *IBM Technical Disclosure Bulletin*, vol. 26, No. 2, p. 537, Jul., 1983.

D. Wendel et al., "Using the On Mode", *CPT Spelling Checker I*, Mar. 1983, 4 pages.

Adam et al, "Spelling Processing . . . Interface", IBM Tech. Discl. Bulletin, vol. 24, No. 10, pp. 5003–5008, 3–82.

Hernandez et al, "Interactive Spelling . . . System", IBM Tech. Discl. Bulletin, vol. 25, No. 8, pp. 4227–4228, 1–83.

Hackett, "Spell Checking Typewriter", IBM Tech. Discl. Bulletin, vol. 18, No. 2, pp. 530–531, 7–75.

Barker et al, "Method for Detecting . . . System", IBM Technical Disclosure Bulletin, vol. 25, No. 8, p. 4225, 1–83.

ELECTRONIC TYPEWRITER WITH SPELL CHECKING AND CORRECTION CROSS-REFERENCE TO RELATED APPLICATION

This application is a continution-in-part of application Ser. No. 787,053 filed Oct. 5, 1985, now abandoned.

BACKGROUND OF THE INVENTION

1. Technological Field

The present invention relates to an electronic typewriter, particularly to the checking of the spelling of each inputted English word.

2. Prior Art

A conventional word processor having a cathode-ray tube (referred to as CRT below) is provided with an electronic dictionary in which numerous English word data are previously stored. Each of the English words in an inputted sentence is compared with those stored in the electronic dictionary to judge whether the spelling of the inputted English word is correct or not (checking of spelling). The inputted sentence is displayed on the CRT of the word processor. If it is judged by the checking of the spelling that there is a misspelled English word among the English words of the sentences displayed on the CRT, the misspelled word is displayed in the reverse form, for example, in order to be distinguished from the other correctly-spelled words. However, an electronic typewriter includes a display unit capable of showing only several characters or lines or does not include such display unit at all. The electronic typewriter, which does not include such display unit and therefore cannot indicate words whose amount occupies a sheet of paper, cannot inform the user of the result of the checking of the spelling of each word. Another electronic typewriter, which includes a display unit capable of showing plural sentences or lines, cannot exactly nor quickly indicate each misspelled English word or its position on the sentence, so that it is necessary to sequentially scroll the English words of the sentences by a scroll key to search for each misspelled word. Such scrolling takes much trouble and results in making the checking of the spelling very troublesome and making the use of the typewriter cumbersome.

SUMMARY OF THE INVENTION

The object of the present invention is to provide an electronic typewriter which includes a display unit capable of showing only several words or lines and yet which allows the user of the typewriter to be informed of the result of checking of spelling.

Specifically, the invention includes a memory for storing English sentences inputted into the electronic typewriter by operating its keyboard, a dictionary memory in which data on plural English words are stored and a spelling check control system. The typewriter is also provided with a checking execution or confirmation key for checking the spelling of each English word of the English sentences stored in the memory. When the checking execution key is operated, the English sentence data stored in the memory are read out by a spelling check control means to determine the coincidence with those stored in the dictionary memory. If it is determined by the spelling check control means that the English words of the English sentences stored in the memory include a word not corresponding to any of the English word data stored in the dictionary memory, the printed position of the word on printing paper is determined by a printed position detection means on the basis of the English sentence data stored in the memory. A feed means and a carriage movement means are driven through the action of a drive control means on the basis of the printed position determined by the detection means, to guide a printing head to the printed position.

The number of words determined to be misspelled is counted and the count number is changed each time the printing head is driven to one of the stored printed positions. A display responsive to the count number displays whether any printed misspelled word remains to be corrected, and cancelling means automatically cancels the checking execution or confirmation mode when the count number is indicative that no printed misspelled word remains to be corrected.

Other characteristics and advantages of the electronic typewriter according to the invention will appear from the following description, relating to a non-limitative embodiment, as well as the accompanying drawings.

DETAILED DESCRIPTION OF PREFERRED EMBODIMENT

Figure 1:
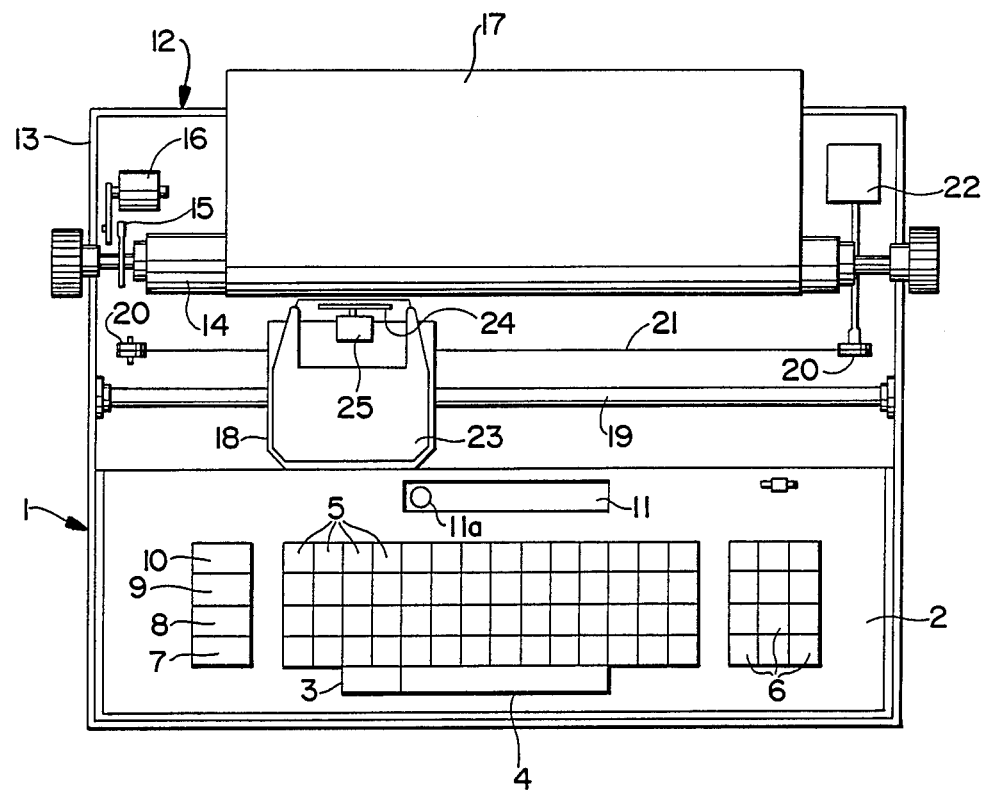
FIG. 1 is a front view of an electronic typewriter which is an embodiment of the present invention.

The embodiment of the present invention is hereinafter described referring to the drawings. An electronic typewriter 1 has various keys such as a shift key 3, a space key 4 and many character keys 5 as input keys, on a keyboard 2, as shown in FIG. 1. When each character key 5 is operated, data on the alphabetical letter corresponding to the key are chosen and inputted. Digit keys 6 are provided at the right of the character keys 5. When each digit key 6 is operated, data on the digit corresponding to the key are chosen and inputted. A pass key 7, a replacing key 8 and a correction executing key 9 are provided at the left of the character keys 5. A checking execution key 10 is provided behind the correction executing key 9. The checking execution key 10 is used when the spelling of an inputted English word is to be checked.

A display unit 11 is provided at the center of the rear portion of the keyboard 2 so that the English word inputted by the character keys 5 is displayed and various messages can be displayed. Display unit 11 advantageously further comprises an indicator light 11a, such as e.g., a light emitting diode, for indicating that the typewriter is in the spelling correction confirmation mode, as discussed more fully herein below.

A printer 12 is provided behind the keyboard 2. A platen 14 is supported on the frame 13 of the printer 12 so that the platen can be rotated back and forth. One end of the platen 14 is drivingly coupled to a line feed motor 16, which serves as a feed means, through a gear mechanism 15 so that the platen is rotated back or forth by the backward or forward rotation of the motor to guide printing paper 17 in the direction of the rotation of the platen.

A carriage 18 is movably supported on a guide shaft 19 disposed in parallel with said platen 14, and is drivingly coupled to a carriage drive motor 22 through a wire 21 wound on a pulley 20. The carriage 18 is moved rightward and leftward on the guide shaft 19 by the forward and backward rotation of the carriage drive motor 22. A printing ribbon 23, a type wheel 24 and a printing hammer 25, which constitute a printing head, are fited on the carriage 18 to perform printing on printing paper 17 on the platen 14.

The printer 12 has such a correcting function that a correcting ribbon (not shown in the drawing) provided under the printing ribbon 23 is placed into the printing position through the driving of a swinging solenoid 39 mentioned below. The English word printed on the printing paper 17 can be erased by the correcting ribbon so that another English word can be printed in the erased position.

Figure 2:
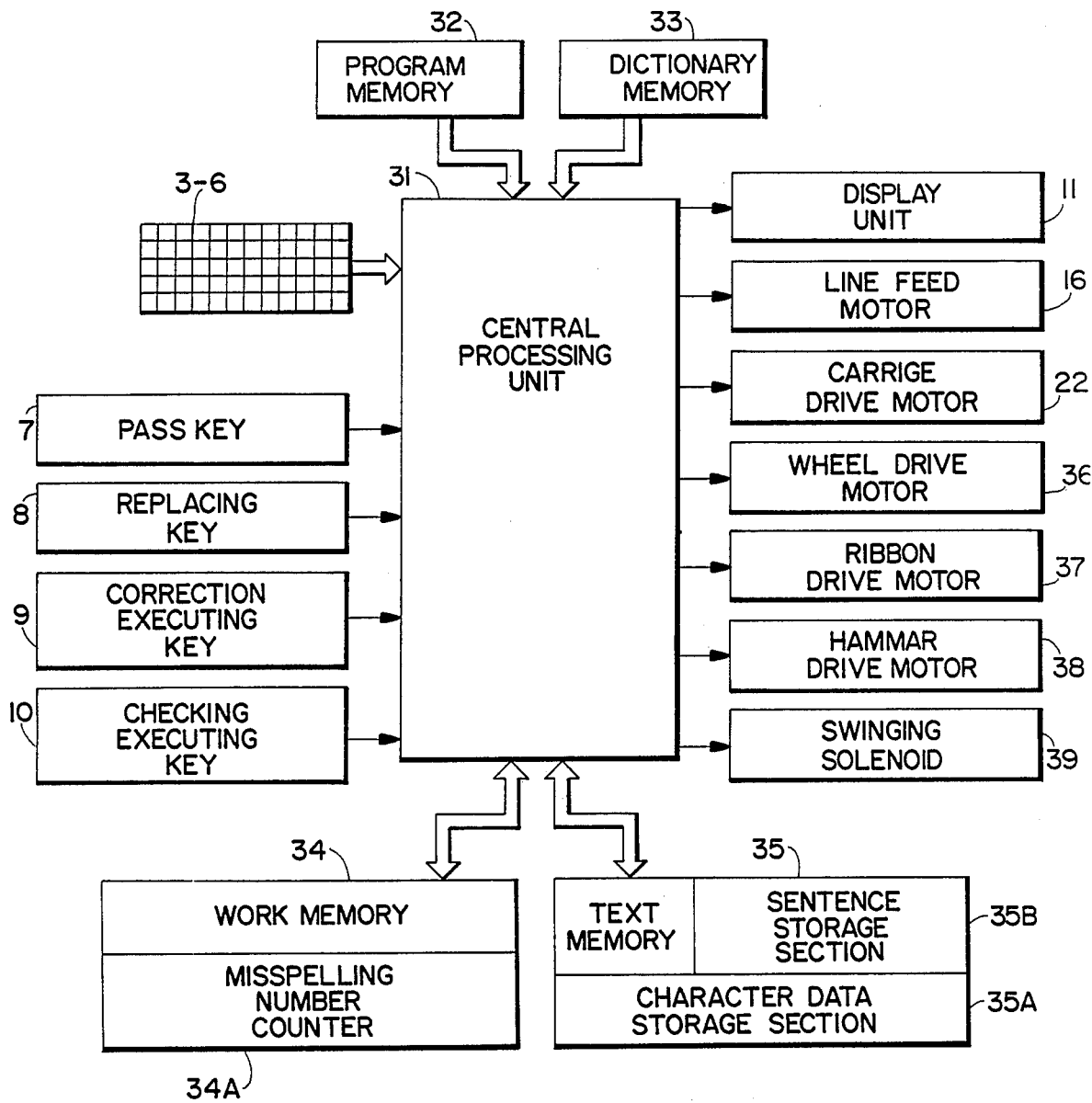
FIG. 2 is an electronic block diagram of the electronic typewriter.

An electronic circuit network built in the electronic typewriter 1 having the above-mentioned constitution will now be described with reference to FIG. 2. A central processing unit (hereinafter referred to as CPU) 31, which comprises writing means, spelling check control means, visual output control means, printed position detection means, work memory writing means, and drive control means, acts in accordance with a control program stored in a program memory 32 made up of a read-only memory (ROM). The CPU 31 receives signals sent by turning on or operating such various keys on the keyboard 2 as the space key 4, the character keys 5 and the checking execution key 10. Corresponding character data are stored into the character data storage section 35a of a text memory 35, on the basis of the input signal from each character key 5 to the CPU 31, so that the character corresponding to the data is shown on the display unit 11, and the printer 12 is driven and controlled to print the character on the printing paper 17. The CPU 31 also responds to the signals from the space key 4 so that a group of characters previously inputted by the operation of character keys 5 and stored in the character data storage section 35a of the text memory 35 are determined to be a single English word.

The CPU 31 is set into a spelling check mode by the first operation of the checking execution key 10, set into a misspelling correction mode by the next operation of the key 10, and reset into the initial status different from both said modes, by the third operation of the key 10.

A dictionary memory 33 is made up of a read-only memory (ROM), in which data on a great number of English words are stored. A work memory 34 is made up of a random-access memory (RAM), in which various data on operations which the CPU 31 has performed are temporarily stored. The text memory 35 is made up of a random-access memory (RAM) and comprises the character data storage section 35a and a sentence data storage section 35b, so that character data and English sentence data which are created through the operation of the character keys 5, the space key 4, etc. are stored in the text memory 35.

The CPU 31 controls the drive of the line feed motor 16, the carriage drive motor 22, a wheel drive motor 36 and a ribbon drive motor 37. The wheel drive motor 36 is provided in the carriage 18 to rotate the type wheel 24 to choose a predetermined printing element. The ribbon drive motor 37 is also provided in the carriage 18 to feed the printing ribbon 23.

The CPU 31 also controls the drive of a hammer drive solenoid 38 and the swinging solenoid 39. The hammer drive solenoid 38 is provided in the carriage 18 to drive the printing hammer 25 to strike the chosen printing elment to print a character on the printing paper 17. The swinging solenoid 39 is also provided in the carriage 18 to vertically swing the printing ribbon 23 and the correcting ribbon, which are normally located in an upper and a lower positions respectively, to place each ribbon into the printing position. When the printing ribbon 23 and the correcting ribbon are swung down, the printing ribbon is placed into the printing position. When these ribbons are swung up, the correcting ribbons is placed into the printing position.

The CPU 31 is set into the spelling check mode by the operation of the checking execution key 10 so that when the character keys 5 and the space key 4 are operated, printing is performed on the printing paper 17 on the basis of the operation of these keys and the checking of the spelling is executed concerning a group of character data stored in the character data storage section 35a of the text memory 35 as data representing a single English word.

To perform the checking of the spelling, the character data determined as the English word in terms of the operation of the space key 4 is compared with each of many English words stored in the dictionary memory 33.

At that time, the CPU 31 sequentially reads out the English word data from the dictionary memory 33 to search for English word data which corresponds to the English word defined by the operation of the spce key 4. When the CPU 31 finds the English word data corresponding to the inputted English word, the CPU regards the spelling of the English word as correct, stores the English word data into the sentence data storage section 35b of the text memory 35, and thereafter waits for a next English word to be inputted.

If there is no corresponding English word data found, the CPU 31 regards the inputted English word as misspelled, and thereafter stores the data on the inputted English word into the sentence data storage section 35b of the text memory 35. The position (determined in terms of the intersection of a printing line and a printing column) of the English word which is misspelled and which is printed on the printing paper 17 and stored in the text memory 35 is detected by the CPU 31 on the basis of the line feed data previously stored in the text memory 35 data; the total number of the previously stored English words and spaces, etc. of the printing line; and the start position of the printing line which the user of the elecronic typewriter 1 has set by the operation of keys beforehand. The printed position data are stored into the work memory 34 together with data on the English word regarded as misspelled.

At that time, using one of several known routines, the CPU 31 chooses an English word, which is supposed as the correct one for the printed position, out of the dictionary memory 33, and the CPU stores the English word into the work memory 34, and adds one to the content of a misspelling number counter 34a allocated in the work memory 34. After storing said printed position data, etc., into the work memory 34, the CPU 31 waits for a next English word to be inputted.

In other words, when English words are sequentially printed on the printing paper 17, come English words judged as misspelled and printed on the printing paper are stored into the work memory 34 together with the data on the printed positions of the words and those on English words supposed as correct ones for the printed positions, and the number of the English words judged as misspelled is counted.

When the operation of the checking execution key 10 is performed as the CPU 31 is in the spelling check mode, the CPU is set into the spelling correction mode so that the CPU reads out the data on the English word first judged as misspelled and stored in the work memory 34, those on the printed position of the English word, those on the correct English word, and the content of the misspelling number counter 34a.

The CPU causes the display unit 11 to show the English word first judged as misspelled, the English word supposed as the correct one, and the total number of the English words judged as misspelled, on the basis of the data on the English words judged as misspelled, those on the English words supposed as the correct ones, and the content of the misspelling number counter 34a. Alternatively, in addition to or in lieu of causing the number of the English words judged as misspelled to be displayed, the CPU 31 causes the indicator light 11a to indicate whether an uncorrected printed misspelled word condition exists based on the content of the misspelling number counter 34a.

At the same time, the CPU 31 acts to drive and control the line feed motor 16 and the carriage drive motor 22 on the basis of the data on the printed position to guide the printing head comprising the type wheel 34 and the printing hammer 25, to the printed position of the English word judged as misspelled and printed on the printing paper 17. When the misspelled word is located on a different line from the line where the carriage is located, the CPU 31 acts to drive and control both the line feed motor 16 and the carriage drive motor 22; and when the misspelled word is located on the same line on which the carriage is located, the CPU 31 acts to drive and control only the carriage drive motor 22 in order to move the printing head to the position of the misspelled word. Thereafter CPU 31 waits for the operation of the pass key 7, the replacing key 8 or the correction executing key 9.

If the pass key 7 is operated, the CPU 31 responds to the turn-on signal sent by the operation of the key, so that the CPU regards the Engish word originally judged as misspelled, as a correctly-spelled English word, subtracts one from the content of the misspelling number counter 34a, and reads out the subtracted content. The CPU 31 then reads out the data on the English word next judged as misspelled, those on the printed position of said English word, and those on the correctly-spelled English word, from the word memory 34 so that the CPU causes the display unit 11 to show the English word judged as misspelled, the English word supposed as the correctly-spelled one, and the total number of the remaining English words judged as misspelled, on the basis of the read-out data.

At the same time, the CPU 31 acts to drive and control the line feed motor 16 and the carriage drive motor 22 on the basis of the data on the printed position to guide the printing head to the printed position of the English word judged as misspelled and printed on the printing paper 17. The CPU thereafter waits for the operation of the pass key 7, the replacing key 8 or the correction executing key 9.

If the replacing key 8 is operated, the CPU 31 responds to the signal sent by the operation of the key, to perform replacement correction to correct the English word judged as misspelled and already printed on the printing paper 17, and to print the correctly-spelled English word, on the basis of the data on the correctly-spelled English word. In the replacement correction, the CPU 31 acts to drive and control the swinging solenoid to place the correcting ribbon into the printing position, and then acts to drive and control the carriage drive motor 22, the type wheel 24 and the printing hammer 25 to strike the correcting ribbon onto the printed misspelled English word to erase it. After that, CPU 31 acts to drive and control the swinging solenoid 39 to place the printing ribbon 23 into the printing position, and then acts to drive and control the carriage drive motor 22, the type wheel 24 and the printing hammer 25 on the basis of the data on the correctly-spelled English word to print the word in the blank from which the misspelled English word is already erased.

After the correctly-spelled English word is printed in the blank, the CPU 31 changes the data on the English word judged as misspelled and stored in the sentence data storage section 35b of the text memory 35, for those on the correctly-spelled English word, and then subtracts one from the content of the misspelling number counter 34a and reads out the subtracted content.

Subsequently, the CPU 31 reads out the data on the English word next judged as misspelled, those on the printed position of said English word and those on the correctly-spelled English word, from the work memory 34 in the same manner as mentioned above, and causes the display unit 11 to show the English word next judged as misspelled and the English word supposed as the correctly-spelled one. Similarly, based on the content of misspelling number counter 34a the CPU 31 causes display 11 and/or indicator light 11a to show the total number of the remaining English words judged as misspelled and/or whether any printed misspelled words remain to be corrected. The CPU also acts to guide the printing head to the printed position of the English word judged as misspelled and printed on the printing paper 17. The CPU then waits for the pass key 7, the replacing key 8 or the correction executing key 9 to be operated.

If the correction executing key 9 is operated, the CPU 31 responds to the signal sent by the operation of the key, to perform printing correction to correct the English word judged as misspelled and already printed on the paper 17, by a new operation of keys. In the printing correction, the CPU 31 first acts to place the correcting ribbon into the printing position in the same manner as mentioned above, to strike the ribbon onto the printed misspelled English word to erase it.

The CPU 31 then waits for a key operation to input a different English word so that character data inputted by the operation of character keys 5 are stored into the character storage section 35a of the text memory 35. At that time, the CPU 31 causes the display unit 11 to show the different English word, on the basis of the character data in the character data storage section 35a.

When the space key 4 is operated after the inputting of the different English word, the CPU 31 judges the set of inputted characters as a single English word, and acts to place the printing ribbon 23 into the printing position on the basis of the data on the English word and print it in the blank from which the misspelled word is already erased.

After the printing of the correctly-spelled word, the CPU 31 changes the data on the English word judged as misspelled and stored in the sentence data storage section of the text memory 35, for those on the correctly-spelled English word, and then causes the display unit 11 to show the next English word judged as misspelled, the English word supposed as the correctly-spelled one, and the total number of, and/or whether there are any, remaining misspelled English words, in the same manner as mentioned above. The CPU acts to guide the printing head to the printed position of the English word judged as misspelled and printed on the paper 17, and waits for the pass key 7, the replacing key 8 or the correction executing key 9 to be operated.

Figure 3:
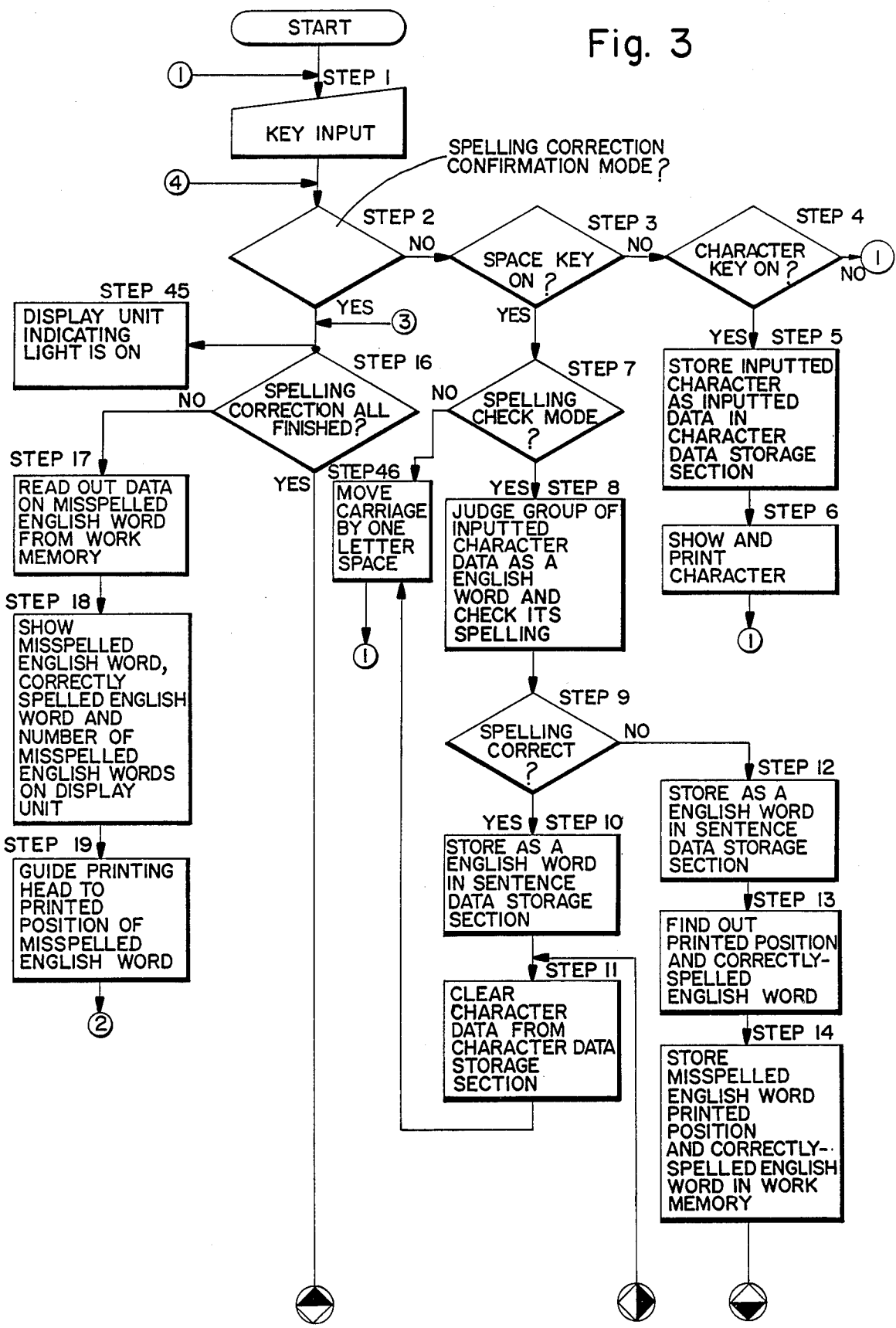
FIGS. 3 and 4 are flowcharts for explaining the control of the electronic typewriter.
Figure 3:
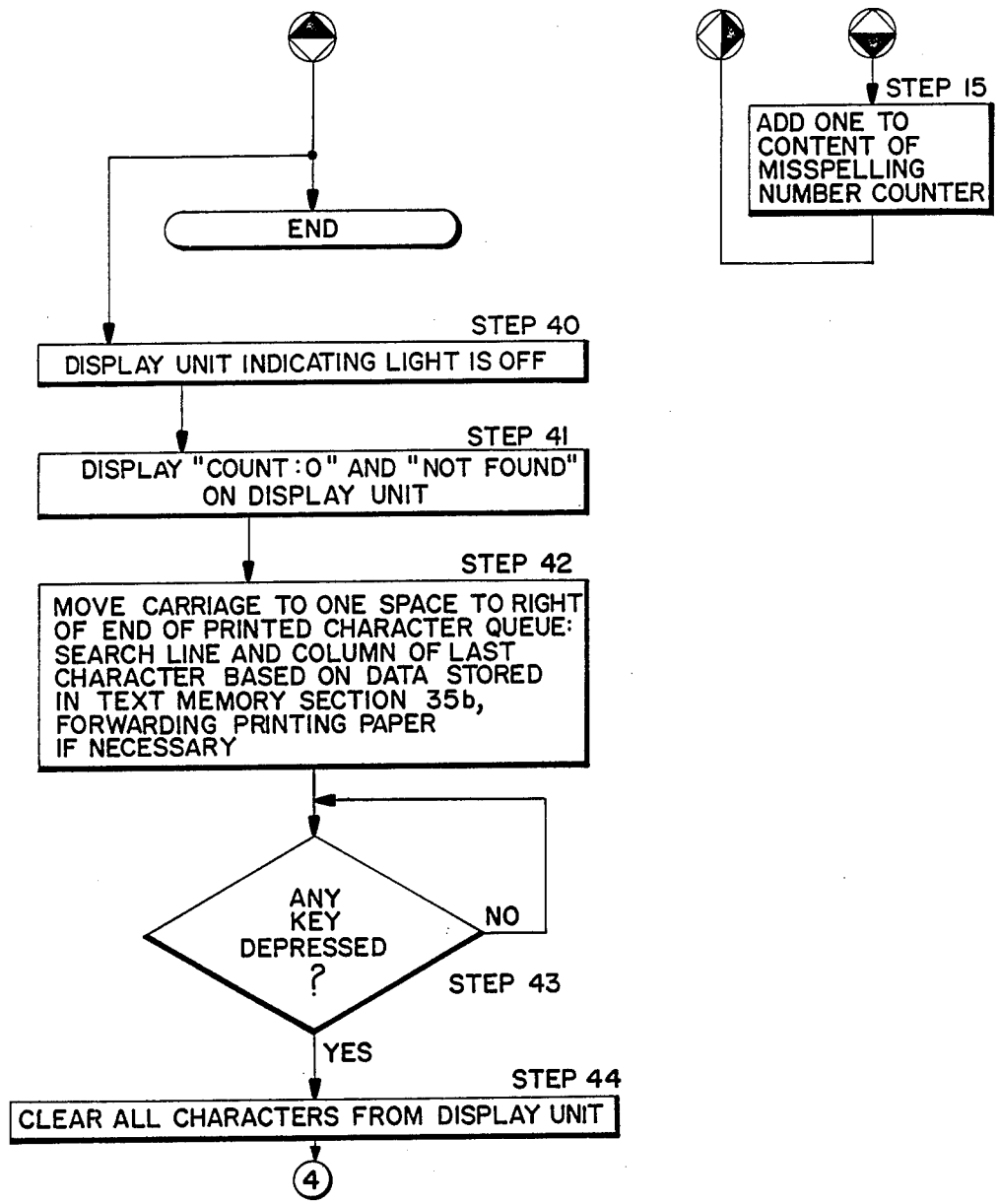
Figure 4:
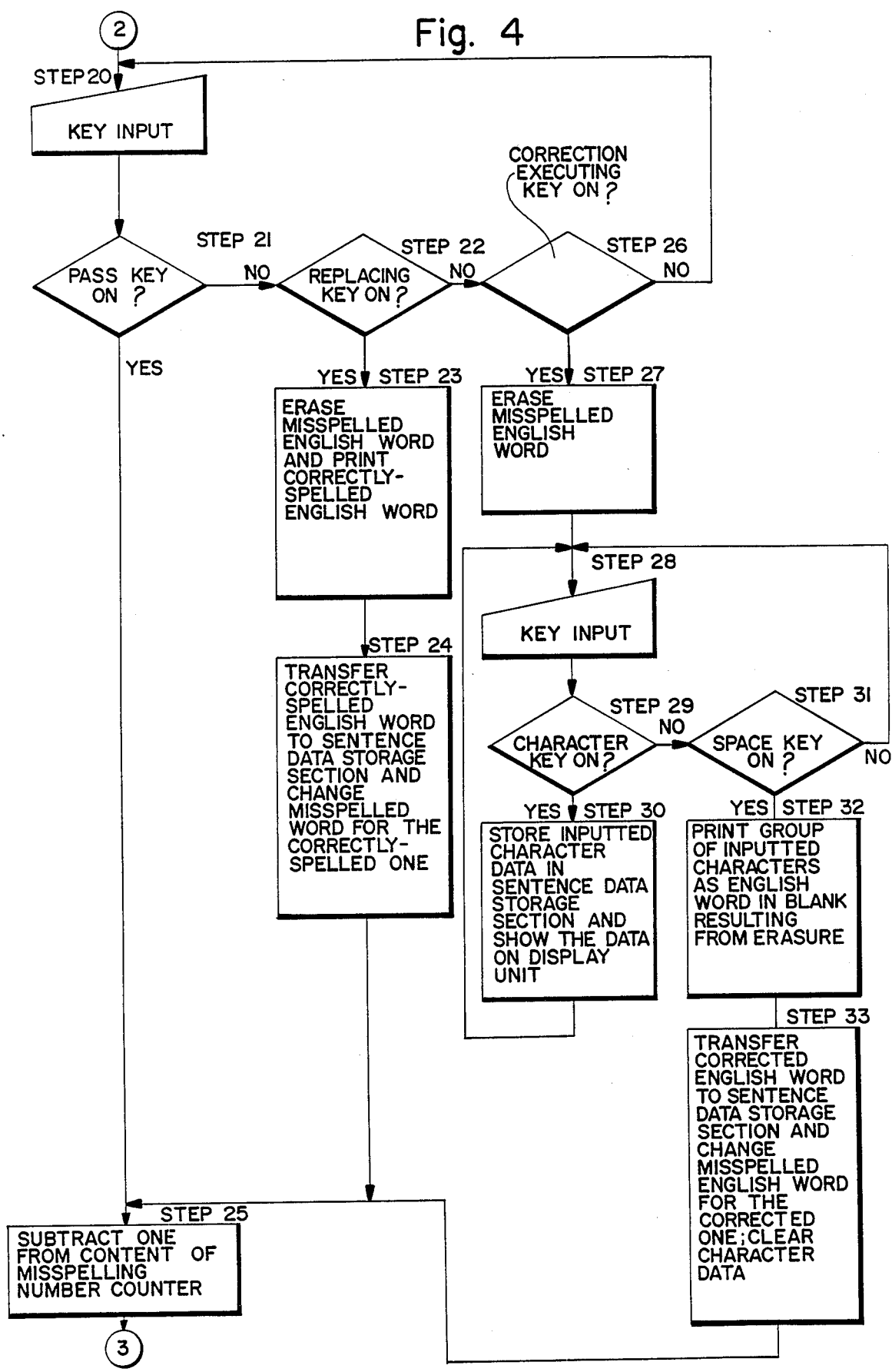

The control of the electronic typewriter 1 having the above-mentioned constitution will now be described with reference to FIGS. 3 and 4. When a character key 5 is operated (Step 1) to input an English word as the CPU 31 is already set in the spelling check mode by the turn-on operation of the checking execution key 10, the CPU judges (Step 2, 3 and 4) the character key 5 to have been operated, so that character data corresponding to the character key 5 are stored (Step 5) into the character data storage section 35a allocated in the text memory 35, the corresponding character is shown on the display unit 11 on the basis of the character data, and the printer 12 is driven and controlled to print the character on the printing paper 17 (Step 6). The CPU 31 then waits for a next character to be inputted (Step 1).

Similar operations are repeated so that sequentially inputted character data are sequentially stored into the character data storage section 35a of the text memory 35, and the characters are shown on the display unit 11 and printed on the printing paper 17, on the basis of the data.

When the space key 4 is operated (Step 1) after an English word is inputted by the key operation, the CPU 31 judges (Step 3) the space key to have been operated, and then determines (Step 7) whether the CPU is in the spelling check mode or not. If the CPU is not in the spelling check mode, the printer is driven and controlled to move the carriage 18 by one letter space (Step 46).

If the checking execution key 10 is operated, namely, the CPU 31 is in the spelling check mode, the CPU regards character data stored in the character data storage section 35a, as an English word, and checks (Step 8) whether the English word is correctly spelled or not.

If the CPU has judged (Step 9) as a result of the checking of the spelling that the inputted English word is correctly spelled, the CPU stores (Step 10) the data on the English word into the sentence data storage section 35b of the text memory 35, then clears (Step 11) the character data stored in the character data storage section 35a of the text memory 35, causes the printer carriage 18 to be moved by one letter space (Step 46) and waits for a next English word to be inputted.

In contrast, if the CPU 31 has judged (Step 9) the inputted English word as misspelled, as a result of the checking of the spelling, the CPU stores (Step 12) the data on the English word into the sentence data storage section 35b of the text memory 35, and determines (Step 13) the printed position of the English word on the printing paper 17. At that time, using known methods, the CPU 31 chooses (Step 13) an English word supposed as correctly spelled, out of the dictionary 33. The CPU 31 then stores (Step 14) the data on the determined printed position, those on the correctly-spelled English word and those on the English word judged as misspelled, into the work memory 34, and adds (Step 15) one to the content of the misspelling number counter 34a of the work memory 34. After that, the CPU 31 clears (Step 11) the contents of the character data storage section 35a and causes the printer carriage 18 to be moved by one letter space in the same manner as mentioned above, and waits for a next English word to be inputted.

If English words are sequentially inputted, the above-mentioned processing is repeated so that the inputted English word are sequentially printed on the printing paper 17 and sequentially stored into the text memory 35. If these inputted English words include a word judged as misspelled, the word, the data on the printed position of the word and the English word supposed as correctly spelled are sequentially stored into the work memory 34, and the number of all the English words judged as misspelled is also stored into the work memory 34.

When the operation of the checking execution key 10 is performed (Step 1) again after the inputting of an English sentence, the CPU 31 is set into the spelling correction confirmation mode. The CPU then judges (Step 2) the spelling correction confirmation mode, and determines (Step 16) whether the content of the misspelling number counter 34a of the work memory 34 is zero or not, namely, whether there is a misspelled English word or not. After that the CPU reads out (Step 17) the data on the English word first judged as misspelled, those on the printed position of the word, those on the correctly-spelled English word and the content of the misspelling number counter 34a, into the work memory 34.

The CPU 31 causes (Step 18) the display unit 11 to show the English word judged as misspelled, the English word supposed as correctly spelled, and the total number of the English words judged as misspelled, on the basis of the read-out data and content, and acts to drive and control the line feed motor 16 and the carriage drive motor 22 to guide (Step 19) the printing head comprising the type wheel 34 and the printing hammer 25, to the printed position of the English word judged as misspelled and printed on the printing paper 17. When the misspelled word is located on a different line from the line where the carriage is located, the CPU 31 acts to drive and control both the line feed motor 16 and the carriage drive motor 22; and when the misspelled word is located on the same line on which the carriage is located, the CPU 31 acts to drive and control only the carriage drive motor 22 in order to move the printing head to the position of the misspelled word. The CPU then waits (Step 20) for the pass key 7, the replacing key 8 or the correction executing key 9 to be operated.

If the replacing key 8 is operated in that state, the CPU 31 responds (Steps 21 and 22) to the signal sent by the operation of the key, to place the correcting ribbon into the printing position to correct the English word judged as misspelled and printed on the paper 17, and to print the correctly-spelled English word in the printed position, on the basis of the data on the correctly-spelled English word. The CPU then acts to drive and control the carriage drive motor 22, the type wheel 24 and the printing hammer 25, on the basis of the English word data stored in the work memory 34, to strike the correcting ribbon onto the printed English word judged as misspelled, to erase the word and print (Step 23) the correctly-spelled English word in the blank from which the misspelled word is alrady erased.

After the printing of the correctly-spelled English word, the CPU 31 changes (Step 24) the data on the English word which is judged as misspelled and which is stored in the sentence storage section 35b of the text memory 35, for those on the correctly-spelled English word, and subtracts (Step 25) one from the content of the misspelling number counter 34a of the work memory 34. The CPU then determines (Step 16) whether the content of the counter 34a is zero or not, to perform the next spelling correction.

If the correction executing key 9 is operated (Step 26), the CPU responds (Steps 21, 22, and 26) to the signal sent by the operation of the key, to place the correcting ribbon into the printing position and strike the ribbon onto the printed English word judged as misspelled, to raise (Step 27) the word, in the same manner as mentioned above.

The CPU then waits (Step 28) for a key operation for inputting a different English word. If a character 5 is operated, the CPU 31 judges (Step 29) the character key 5 as operated, and stores the character data inputted by the operation of the key 5, into the character data storage section 35a of the text memory 35, and causes (Step 30) the display unit 11 to show the inputted character, on the basis of the character data stored in the storage section 35a.

When the space key 4 is operated (Step 28) after the inputting of an English word, the CPU 31 responds (Steps 29 and 31) to the turn-on signal sent by the operation of the space key, to judge the group of inputted characters as an English word to place the printing ribbon 23 into the printing position on the basis of the data on the English word, in the same manner as mentioned above, and thereafter print (Step 32) the inputted English word in the blank from which the former English word is already erased.

After the printing of the English word, the CPU 31 changes the data on the English word judged as misspelled and stored in the text memory 35, for those on the printed correctly-spelled English word, and clears (Step 33) the character data stored in the character data storage section 35a. Subsequently, the CPU 31 subtracts (Step 25) one from the content of the misspelling number counter 34a of the work memory 34, and then determines (Step 16) whether the content of the counter 34a is zero or not, to perform the next spelling correction, in the same manner as mentioned above.

If the pass key 7 is operated (Step 20), the CPU 31 responds to the turn-on signal sent by the operation of the key 7, to judge that the English word previously judged as misspelled is correctly spelled, and the CPU then subtracts (Step 25) one from the content of the misspelling number counter 34a of the work memory 34 and determines (Step 16) whether the content of the counter 34a is zero or not. The CPU thereafter performs the same processing as mentioned above. It will be understood from the above-mentioned description that the operation of the pass key 7 can be utilized when a special term or a proper noun such as a person's name, which is not stored in the dictionary memory 33, is judged as misspelled.

Until all English words judged as misspelled and stored in the work memory 34 are corrected of their spellings, the CPU 31 sequentially reads out data from the work memory 34 to correct the spellings on the basis of the read-out data. If the content of counter 34a is zero, the CPU 31 automatically cancels the confirmation mode; causes the display unit to display an appropriate message, such as "COUNT:O" and "NOT FOUND", indicating that no printed misspelled words remain to be corrected (Step 41); and drives and controls the carriage 18 to move to a position one space to the right of the end of the printed character queue by searching for the line and column of the last character based on the data stored in section 35b of text memory 35 (Step 42). It will be appreciated that so moving carriage 18 may also require the printing paper to be forwarded with the platen 14. When any key is subsequently operated (Step 43), the CPU 31 causes all characters to be cleared from display unit 11 (Step 44). Operation of the typewriter then proceeds as before depending on what keys are operated.

When an English word which is judged as misspelled and is to be corrected of its spelling exists in an English sentence printed on the printing paper 17, the English word is shown on the display unit 11 and the printing head is guided to the printed position of the word so that the location of the word can be immediately determined.

In addition, an English word supposed as correctly spelled is also shown on the display unit 11 so that the replacing key 8 is operated if an English word judged as misspelled is to be replaced with the English word supposed as correctly spelled, or that the correction executing key 9, the character keys 5 and the space key 4 are operated if the English word judged as misspelled is to be replaced with an English word other than the word supposed as correctly spelled. As a result, the English word judged as misspelled is erased from the printing paper 17, and the English word to replace the former is printed in the blank from which the former is already erased. For that reason, the printing paper 17 is economically used.

Furthermore, since the content of the misspelling number counter 34a is shown on the display unit 11, namely, the number of remaining misspellings during the process of misspelling correction is shown in the display unit, it is easy to come to know how many English words judged as misspelled remain.

Alternatively, in addition to or in lieu of displaying the number of misspelled English words on the display unit 11, the CPU 31 advantageously responds to the signal produced by the operation of checking execution key 10 which sets CPU 31 into the spelling correction confirmation mode (Step 2) by turning on display light 11a and maintaining display light 11a in the ON condition so long as the count number in the misspelling number counter 34a is not zero (Steps 40 and 45).

Although a group of characters inputted by the operation of the character keys 5 is judged as an English word and the checking of its spelling is performed (Step 8) when the space key 4 is operated in Step 3 in the above-mentioned embodiment, the checking of the spelling may be performed in response to the operation of a period key, a comma key or the like instead of the space key 4.

Though the work memory 34 and the text memory 35 are described as separated units in the above-mentioned embodiment, the functions of these memories may be fulfilled by a single memory and the character data storage section 35a may be substituted by a storage section built in the CPU 31.

Naturally, these different variants of the electronic typewriter according to the invention constitute only non-limitative examples, and numerous other variants can be made without departing from the scope of the present invention.

What is claimed is:

1. An electronic typewriter comprising:

a keyboard for generating signals responsive to depressed keys, said keyboard including character keys for entering at least character data, a separating key for separating said character data entered by said character keys into words, and a confirmation key for generating a confirmation mode therefrom when an operator confirms the spelling of a word;

a dictionary memory for storing a plurality of word data corresponding to spellings of words;

at least one memory for storing words entered from said keyboard;

memory writing means for writing said words entered from said keyboard into at least one memory;

spelling check control means for reading out said words from said at least one memory and said word data from said word dictionary memory, for comparing the spelling of each read word with said word data, and for determining a misspelled word if word data coincident with said spelling of each read word does not exist in said dictionary memory;

a counter for producing a count number of said misspelled words;

a printer for printing and erasing characters on a printing medium, said printer including feed means for feeding said printing medium and carriage drive means for guiding a printing head;

print control means for printing a character entered in accordance with depression of said character keys on said keyboard by driving said printer;

printed position detection means for determining respective printing positions of said misspelled words;

a work memory for storing said misspelled words and for storing said respective printing positions;

drive control means for generating said confirmation mode in accordance with depression of said confirmation key, for driving said carriage drive means in accordance with one of said stored printing positions to guide said printing head to said one of said stored printing positions and for driving said carriage drive means to guide said printing head to another stored printing position in response to depression of a pass key without erasure of the misspelled word at said one of said stored positions;

count control means for incrementing said count number upon determination of each of said misspelled words by said spelling check control means and decrementing the count number every time the printing head is driven to each of said stored printing positions in accordance with depression of said confirmation key or said pass key in the confirmation mode;

print correct means for erasing a printed word at a respective stored printing position, when said printing head is at said respective position, in accordance with depression of a correction executing key during the confirmation mode, and for printing a word newly entered by said character keys;

cancelling means for automatically cancelling the confirmation mode when said number of said counter is indicative that no printed misspelled words remain to be corrected;

display means responsive to said count number for displaying whether there is at least one printed misspelled word which remains to be corrected; and to said cancelling means for automatically displaying whether said confirmation mode is cancelled; and display control means for reading out a respective misspelled word corresponding to the printing head position from said word memory and for displaying said misspelled word on said display means during the confirmation mode.

2. The electronic typewriter as claimed in claim 1, wherein said print correct means includes means for printing said word newly entered on a blank resulting from said erasing.

3. The electronic typewriter as claimed in claim 2, wherein said print correct means includes means for printing said word newly entered by printing a character in accordance with every depression of the character key on said blank resulting from said erasing.

4. The electronic typewriter as claimed in claim 1, wherein said print correct means includes means for overwriting said word newly stored onto a respective misspelled word stored in said at least one memory.

5. The electronic typewriter as claimed in claim 1, wherein said cancelling means cancels the confirmation mode when said count number becomes zero.

6. The electronic typewriter as claimed in claim 1, wherein said display means said count number.

7. The electronic typewriter as claimed in claim 1, wherein said display means includes an indicating light which is activated only during the confirmation mode.

8. The electronic typewriter as claimed in claim 1, wherein said display means displays a character message indicating whether any printed misspelled word remains to be corrected.

9. The electronic typewriter as claimed in claim 1, wherein said display control means includes means for displaying said word newly entered on said display means during the confirmation mode.

10. The electronic typewriter as claimed in claim 9, wherein said print correct means includes means for printing said word newly entered and displayed on said display means in accordance with depression of the separating key during the confirmation mode.

11. The electronic typewriter as claimed in claim 9, wherein said display control means includes means for displaying both said misspelled word read out from said work memory corresponding to the printing head position and said word newly entered.

12. The electronic typewriter as claimed in claim 4, wherein said at least one memory includes a text memory for storing words entered from said keyboard, and wherein said print correct means includes means for replacing a misspelled word in text memory with a word newly entered by means of said character keys.

13. The electronic typewriter as claimed in claim 1, wherein said drive control means is responsive to said count number being indicative that no printed misspelled words remain to be corrected to drive said carriage drive means to position said printing head at the next printing position such that said printing head is located one space to the right of the end of the character queue printed on the printing medium.

14. An electronic typewriter comprising:

a keyboard for generating signals responsive to depressed keys, said keyboard including character keys for entering at least character data, a separating key for separating said character data entered by said character keys into words, and a confirmation key for generating a confirmation mode therefrom when an operator confirms the spelling of a word;

a dictionary memory for storing a plurality of word data corresponding to spellings of words;

at least one memory for storing words entered from said keyboard;

memory writing means for writing said words entered from said keyboard into said at least one memory;

spelling check control means for reading out said words from said at least one memory and said word data from said dictionary memory, for comparing the spelling of each read word with said word data, and for determining a misspelled word if word data coincident with said spelling of each read word does not exist in said dictionary memory;

a counter for producing a count number of said misspelled words;

a printer for printing and erasing characters on a printing medium, said printer including feed means for feeding said printing medium and carriage drive means for guiding a printing head;

print control means for printing a character entered in accordance with depression of said character keys on said keyboard by driving said printer;

printed position detection means for determining respective printing positions of said misspelled words;

a work memory for storing said misspelled words and for storing said respective printing positions;

drive control means for generating said confirmation mode in accordance with depression of said confirmation key, for driving said carriage drive means in accordance with one of said stored printing positions to guide said printing head to said one of said stored printing positions and for driving said carriage drive means to guide said printing head to another stored printing position in response to depression of a pass key without erasure of the misspelled word at said one of said stored positions; said drive control means being responsive to said count number being indicative that no printed misspelled words remain to be corrected to drive said carriage means to position said printing head at the next printing position such that said printing head is located on space to the right of the end of the character queue printed on the printed medium;

count control means for incrementing said count number upon determination of each of said misspelled words by spelling check control means and decrementing the count number every time the printing head is driven to each of said stored printing positions in accordance with depression of said confirmation key or said pass key in the confirmation mode;

print correct means for erasing a printed word at a respective stored printing position, when said printing head is at said respective position, in accordance with depression of a correction executing key during the confirmation mode, and for printing a word newly entered by said character keys;

cancelling means for automatically cancelling the confirmation mode when said number of said counter is indicative that no printed misspelled words remain to be corrected;

display means responsive to said count number for displaying whether there is at least one printed misspelled word which remains to be corrected; and to said cancelling means for automatically displaying whether said confirmation mode is cancelled; and display control means for reading out a respective misspelled word corresponding to the printing head position from said word memory and for displaying said misspelled word on said displaying means during the confirmation mode.

* * * * *